Dec. 26, 1944.　　　　F. E. SMITH　　　　2,366,067
HOSE COUPLING
Filed June 4, 1943　　　2 Sheets-Sheet 1
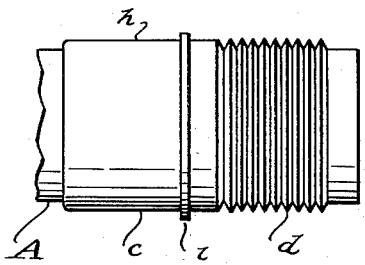
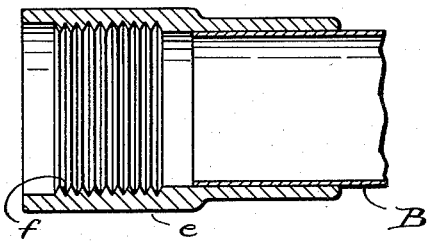
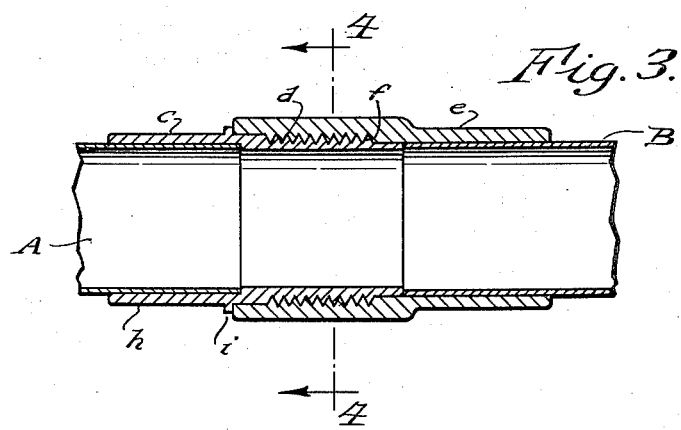
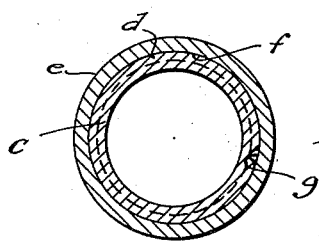
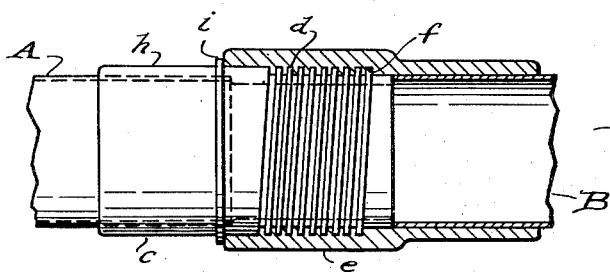
INVENTOR
Franklin E. Smith,
BY Parker, Prochow & Farmer,
ATTORNEYS

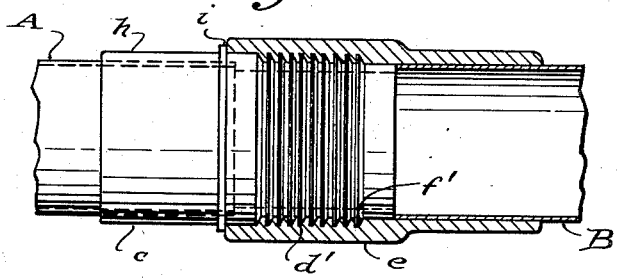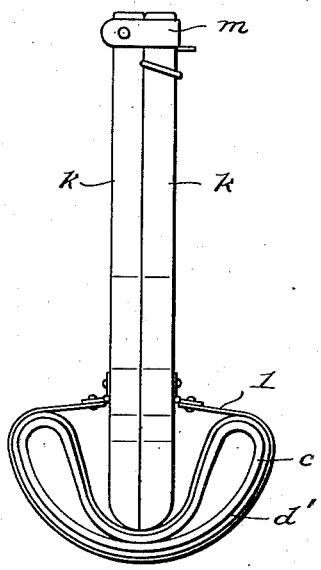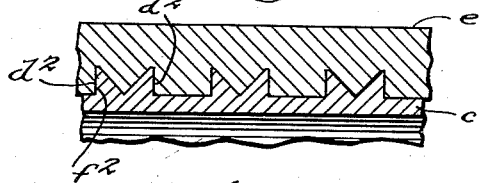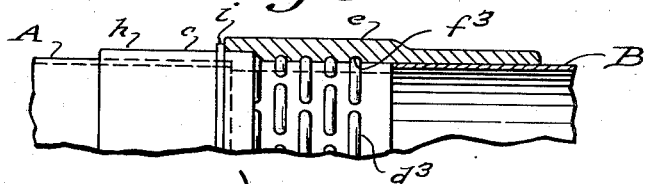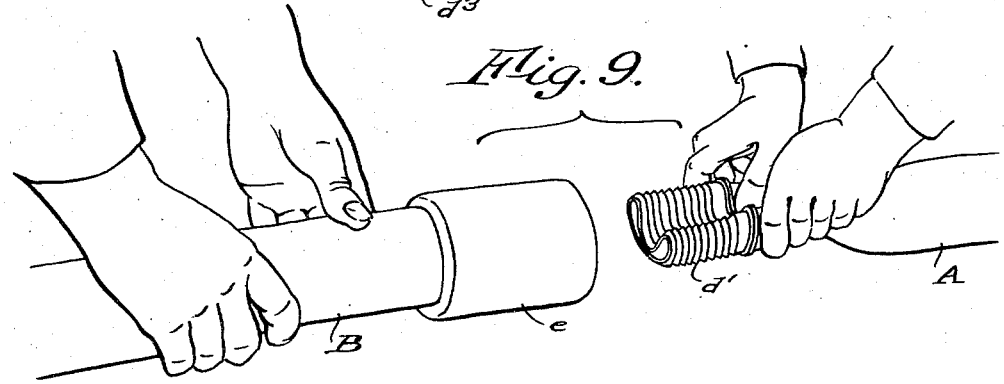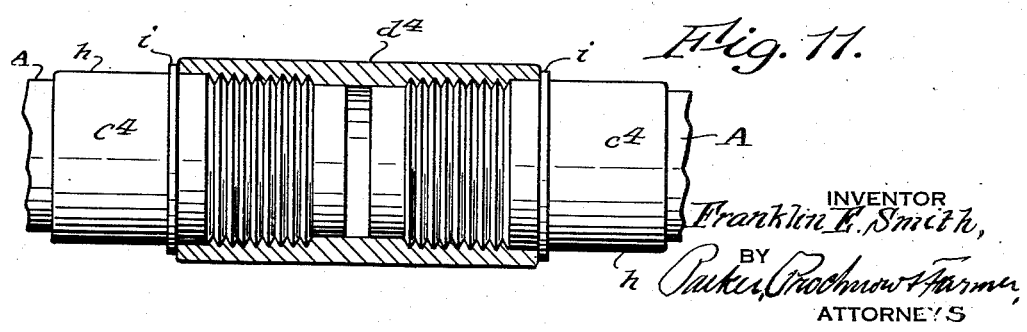

Patented Dec. 26, 1944

2,366,067

UNITED STATES PATENT OFFICE 2,366,067

HOSE COUPLING

Franklin Elijah Smith, South Dartmouth, Mass.

Application June 4, 1943, Serial No. 489,617

11 Claims. (Cl. 285—71)

This invention relates to couplings, and to a method of making the same, for connecting or assembling the sections of hose or pipe used for conducting water or other fluids, and especially of flexible hose for fire extinguishing purposes. This is a continuation in part of my pending application No. 442,646, filed May 12, 1942.

In the use of fire hose for extinguishing fires which occur at considerable distances from the available sources of water supply, it is necessary to connect or assemble numerous hose sections to provide the requisite length of hose to conduct the water from the source of supply to the pumping machine or to the fire. In the case of a serious fire some distance from any available water supply, it is of course important to be able to assemble with the minimum labor and loss of time, the numerous sections necessary to provide a hose of requisite length.

One object of my invention is to provide a coupling by means of which hose or pipe sections can be quickly and easily connected by the simple act of compressing a collapsible coupling member on one section and inserting it lengthwise thereof into the complementary coupling member on another section.

Other objects of the invention are to provide a hose or like coupling which is of light weight, simple and inexpensive improved construction; which involves the minimum use of metal in its construction; which avoids the necessity for the use of heavy, expensive metal fittings or parts employed in the ordinary types of fire hose couplings, avoids the bulk and weight thereof with their liability of breakage by dropping or other causes incident to their use, and avoids the liability of injury to persons by the falling of hose equipped with such metal couplings; which comprises complementary coupling members provided with cooperating surfaces which are held or pressed into contact with each other, so as to form a liquid-tight joint between coupled hose sections, by the pressure of the fluid conducted by the hose; and in which the complementary coupling members are formed with parts which interengage or interlock with each other in such manner as to hold coupled hose sections together in opposition to strong force tending to separate them even when there is no internal fluid pressure in the hose.

Further objects and advantages of the invention will appear from the following specification of preferred embodiments of the invention, shown in the accompanying drawings, and the novel features of the invention are set forth in the appended claims.

While the coupling is primarily intended for joining sections of flexible hose, such as fire hose, the coupling is not necessarily confined to such use, but is also adapted for connecting metal or rigid hose or pipe sections.

According to the invention in the embodiments illustrated in the drawings, the opposing joint members are provided with or comprise spigot and socket members or joints formed on collars or bosses secured to the hose, the spigot consisting of rubber or other resilient material and being formed with peripheral, parallel ribs or beads, which may either be circumferential in relation to the axis of the collar, or obliquely inclined in relation thereto, that is, spirally or helically arranged without joining one another, whilst the socket, which is formed of comparatively rigid or inexpansible material, for example, vulcanized rubber, has corresponding internal grooves in which the said ribs can register. The spigot is pushed into the socket, the ribs on the spigot yielding and being pressed down until they reach the appropriate grooves, into which they spring and make a water-tight joint.

It will be seen that no rotary or screw action is necessary in assembling the couplings or coupling members, and that in the case of helical ribs or grooves above described, they will resist any tendency to rotation.

In order that the said invention may be clearly understood and readily carried into effect, the same will now be further described with reference to the accompanying drawings, in which:

Fig. 1 represents an elevation of the spigot member of a hose coupling illustrating one embodiment of my invention, showing the same in position on a hose pipe and provided with circumferential holding ribs.

Fig. 2 represents a central, longitudinal section in the complementary socket member in position on a hose pipe, and having circumferential grooves for receiving the ribs of the spigot member.

Fig. 3 represents in central, longitudinal section, the assembly of the devices illustrated separately in Figs. 1 and 2.

Fig. 4 is a cross section taken on line 4—4, Fig. 3, illustrating a modification hereinafter mentioned.

Figs. 5 and 6 are longitudinal, sectional elevations showing couplings provided with interlocking ribs and grooves of slightly modified forms.

Figs. 7 and 8 are respectively a fragmentary longitudinal section, and a longitudinal sectional elevation, showing additional slightly modified forms of the interlocking ribs and grooves.

Fig. 9 is a perspective view illustrating the manner of coupling together the complementary coupling members.

Fig. 10 illustrates, in an end elevational view, the use of a suitable tool or implement for collapsing the spigot member of the coupling for inserting it into the socket member.

Fig. 11 is a longitudinal, sectional elevation illustrating an embodiment of the invention in which one of the coupling members is of double-ended type adapted to be removably coupled to complementary coupling members on adjacent hose sections to be joined.

Referring first to Figs. 1–6 of the drawings, A and B indicate two hose pipes or sections to be joined, $c$ the spigot member or fitting provided with ribs $d$, and $e$ the socket member or fitting provided with complementary grooves $f$ adapted to receive or interlock with ribs $d$ for holding the spigot and socket members in their coupled relation.

The ribs may be of any suitable cross section, for instance, rectangular, rounded or V-shaped; one suitable shape would be half V-shaped, that is the ribs $d'$ vertical on the side facing the pipe on which the spigot is located, and having an inclined engaging surface on the side facing the pipe on which the socket is located, as seen in Fig. 6, the groove $f'$ being of corresponding cross sectional shape. This form of the ribs facilitates rapid engagement of the spigot and socket, but as it offers a greater resistance to disengagement, renders accidental disengagement less likely to occur.

To facilitate the collapsing of the spigot member provided with the ribs when inserting the spigot, especially in joining hose pipes of comparatively small diameter, a slot $g$ (see Fig. 4) may be cut through each rib $d$, the slots in the respective ribs being preferably, but not necessarily, in alinement with each other. The location of the bottom of the slot is indicated at $g$ in Fig. 4. When the ribs are compressed at the beginning of the action of engaging the joint, the resilient material on both sides of the slot is forced towards or into the slot, thus reducing the effective circumference of the ribs, which revert to their normal shape and size when the engagement of the joint is completed. This slotting of the ribs, as at $g$, however, can be dispensed with, as will hereinafter appear.

As shown in Fig. 7, the holding ribs may be of substantially M-shape cross section, each rib having opposite end faces $d^2$ perpendicular to the axis of the coupling, and a V-shaped peripheral groove between these end faces. The complementary grooves of the $f^2$ socket member are of similar but reversed cross sectional shape to adapt the grooves to receive the ribs with the faces of the ribs engaging the opposed faces of the grooves.

Fig. 8 shows another modification of the complementary grooves and ribs, in which the ribs $d^3$ and grooves $f^3$ are annularly or circumferentially arranged and of rounded cross sectional form, but are made in interrupted or spaced sections, with the ribs and grooves in adjacent annular rows staggered with reference to one another. Manifestly, interfitting ribs and grooves of still other forms and arrangements, not illustrated, can be employed.

In the embodiment illustrated in Fig. 11, the coupling, as in the previous embodiments, comprises a spigot member $c^4$ and a complementary socket member $d^4$, but one of these members, as the socket member, is of double-ended type having sockets in its opposite ends adapted to receive and hold the complementary spigot members on adjacent hose or pipe sections to be coupled. In this form of the coupling, the spigot members are suitably attached to the adjacent hose sections to be coupled, but the double socket member is a detached, or separate, member adapted to be removably connected to and join the two hose sections by the insertion of their spigot members in the sockets at opposite ends of the socket member. The interengaging ribs and grooves of the spigot and socket members may be of any forms illustrated, or of other suitable form. In the preceding embodiments, one member of the coupling is permanently connected to one hose section, and the different complementary member is permanently connected to the other hose section, whereas in this double-ended modification of Fig. 11, each hose section has a spigot member permanently attached thereto, and the socket member is not permanently attached to either hose section, but is a separate part adapted to be removably connected to each hose section by interlocking engagement with the spigot member on such section. Obviously, the detached, double-ended coupling member, instead of being a socket member, could be a spigot member formed with corresponding spigot portions at its opposite ends adapted to be received and removably secured in socket members fastened on or connected with the hose sections to be joined.

The spigot and socket members, in any of the forms disclosed, may be suitably reinforced to prevent splitting or fracture, the reinforcement of the spigot necessarily consisting of flexible material, for instance, woven textile material, which will leave the spigot member resilient and collapsible or deformable, whilst the reinforcement of the socket may consist of textile or analogous material supplemented with other rigid material, such as sleeves or rings of metal.

It will be noted that in each of the disclosed embodiments of the invention, the spigot member has an annular exterior surface portion adapted to fit in and contact with an interior annular surface of the socket member, and these annular surfaces of the spigot and socket members have complementary parts, such for example as ribs and grooves, which interengage or interlock with each other to hold the members coupled together in opposition to force tending to pull apart or separate them in axial direction, and the spigot or inner member being of resilient or elastic construction, as by being made of material such as rubber, the internal pressure of the fluid conducted by the hose will act to expand or press its said annular surface against the surrounding annular surface of the socket member and thereby form a fluid-tight joint between them, which will prevent leakage of water or fluid from the hose at the coupling.

The complementary spigot and socket members constructed as described, can be quickly and easily secured in coupled relation by collapsing or contracting the resilient spigot member transversely, by pressing inwardly one side thereof, as indicated in Figs. 9 and 10, and the spigot member can be then inserted in its collapsed condition by direct lengthwise movement thereof into the socket member. Then, when the collapsing pressure is removed, the spigot member will, by reason of its inherent elasticity, resume its normal annular form within the socket member and cause the holding ribs or parts of its exterior surface to interengage or interlock with the complementary holding grooves or parts of the socket member and hold the members coupled together. In thus collapsing the spigot member for insertion into the socket member, its exterior peripheral dimension is not appreciably shortened or changed, but the spigot is deformed to a collapsed shape in which opposite portions of its walls are brought nearer together, rather than being spread apart, so that it is adapted to be inserted lengthwise into the socket member. The spigot member is made with an inner end portion $h$ preferably cylindrical, which, in the coupled relation of the coupling members projects a substantial distance outwardly from the socket member for application thereto of the pressure for collapsing the spigot member.

Preferably, the spigot member, in any of its various forms, is provided exteriorly with a stop member $i$, which may be in the form of a circumferential projecting collar on the spigot member adapted, when inserting the spigot member into the socket member, to engage the outer end of the latter, and thereby arrest the inserting movement of the spigot when it is in a position in which the complementary holding parts of the spigot and socket register with each other so that they will interengage or interlock when the collapsing pressure is removed and the spigot permitted to resume its normal annular form in the socket. With the spigot and socket members constructed as disclosed, with the complementary interlocking or holding parts, the members will be held together even when there is no fluid pressure in the hose against a considerable force tending to pull them apart, such as might be produced, for instance, by the weight of one or more firemen sliding down the hose as a means of escape from a burning building.

If the diameter of the coupling should be too large or the spigot member too stiff for the latter to be conveniently collapsed by direct pressure of the hands, as illustrated in Fig. 9, it can be readily collapsed by means of a suitable tool, such as indicated in Fig. 10. This tool comprises two bars or handles $k, k$, pivoted between their ends to the opposite ends of a flexible strap or band $l$. By placing the tool with the band passing around one side of the spigot member and the inner ends of the two bars bearing against the opposite side of the member, and then forcing the outer ends of the bars towards each other, the spigot member can be easily collapsed to the shape shown in Fig. 10, and it can be retained in this shape until inserted into the socket member, by means of a fastening bail $m$ which is pivoted to the outer end of one handlebar $k$ and is adapted to be swung over the adjacent end of the other bar, as shown in Fig. 10. After inserting the spigot member to the proper position in the socket member, the fastening bail $m$ is released and the tool removed. This tool forms the subject of a separate application in which its construction and operation are more fully disclosed.

I claim as my invention:

1. A hose coupling for the rapid coupling together and uncoupling of hose sections, comprising a relatively inexpansible tubular socket member connected with one hose section, and a tubular spigot member of resilient material which is connected with another hose section to be coupled to said first section and is normally maintained by its resilience in an annular form that will fit in the socket member with an annular exterior surface of the spigot member contacting a surrounding annular interior surface of the socket member, said contacting surfaces of the socket and spigot members having complementary peripherally extending parts which interlock with each other and by such interlocking hold said members against axial separation, and said spigot member being transversely collapsible and exposed for free collapse, and while so collapsed being insertable lengthwise into the socket member and acting by its resilience when the collapsing pressure is released to resume its normal annular form and interlock its said surface parts with the complementary surface parts of the socket member, said annular surfaces of said members being held in close contact and forming a fluid-tight joint by fluid pressure in the hose.

2. A hose coupling substantially as set forth in claim 1, in which said spigot member is provided with a stop projection which abuts an outer portion of the socket member and arrests relative coupling movement of the spigot and socket members when said complementary holding parts register so as to interlock with each other.

3. A hose coupling substantially as set forth in claim 1, in which said spigot member has a portion that projects a substantial distance outwardly beyond the socket member when coupled thereto for the application of pressure for collapsing the spigot member.

4. A hose coupling substantially as set forth in claim 1, in which said complementary interlocking parts of the socket and spigot members comprise interfitting annularly disposed ribs and grooves on said members.

5. A hose coupling substantially as set forth in claim 1, in which said complementary interlocking parts of the socket and spigot members comprise interfitting annular ribs and grooves of approximately half-V shape cross section having perpendicular sides facing towards the inner ends of the coupling members.

6. A hose coupling substantially as set forth in claim 1, in which said complementary interlocking parts of the socket and spigot members comprise interfitting annular ribs and grooves of approximately M-shape cross section with oppositely facing perpendicular end faces.

7. In non-rotary spigot and socket couplings for the rapid assembly and disassembly of sections of hose pipes, a resilient spigot member capable of being collapsed by pressure applied externally and having integrally formed thereon a series of separate parallel peripheral ribs, and a relatively rigid socket member having a series of separate internal parallel grooves formed therein, said ribs being adapted to register in said grooves when said spigot member is collapsed and inserted in a longitudinal direction into said socket member, whereby a firm temporary coupling of said sections is achieved.

8. In flexible hose pipes for the passage of liquids, a shoulder portion secured to one pipe, a member of resilient material on said shoulder portion integrally provided with separate peripheral parallel ribs extending completely around said member, a second shoulder portion secured on another pipe to be joined to said first named pipe, said second shoulder portion being formed with a socket of relatively hard material provided with corresponding separate parallel internal grooves in which said ribs are adapted to register when the spigot member is collapsed and pushed into the socket.

9. In non-rotary spigot and socket couplings for the rapid assembly and disassembly of sections of flexible hose pipes, a socket member having separate and completely annular internal parallel grooves, and a spigot member of resilient material having separate and completely annular peripheral parallel ribs, the ribs and grooves extending over the whole circumference of the meeting portions and are arranged obliquely in relation to the longitudinal axes of the members to be joined, and said ribs being adapted to register in said grooves when said spigot member is simply collapsed and directly pushed into the socket member in the direction of the longitudinal axis of the latter, whereby a firm temporary coupling of said sections is achieved.

10. A spigot and socket coupling construction according to claim 7, having at least some of the ribs upon the spigot member provided with individual slots disposed substantially transversely thereto in order to facilitate temporary collapsing of the ribbed portion of said spigot member preparatory to insertion thereof into the socket member.

11. A spigot and socket coupling for the rapid coupling and uncoupling of two pipes, which comprises a relatively rigid, tubular socket member, and a freely flexible, resilient, tubular spigot member formed to fit and disposed within the passage of said socket member and exposed on its interior in the portion within said socket member so as to be freely collapsible inwardly upon the application thereto of external pressure, to facilitate its introduction into and removal from the passage of the socket member by its endwise movement, and by its resiliency resuming its original shape when released from said external pressure, the abutting peripheral surfaces of said members having interlocking shoulders that are generally transverse to the passage of said spigot member, with said shoulder on the spigot member engaged behind the cooperating shoulder on the socket member to resist separation of said members by their endwise movement, whereby the spigot member may be collapsed inwardly by external forces thereon to disengage said shoulders and enable separation of said members by their relative endwise movement.

FRANKLIN ELIJAH SMITH.